(12) United States Patent
Miyoshi et al.

(10) Patent No.: US 8,728,418 B2
(45) Date of Patent: May 20, 2014

(54) METHOD FOR PRODUCING METAL HYDROXIDE FINE PARTICLE

(75) Inventors: Yoshiyuki Miyoshi, Ashigarakami-gun (JP); Makoto Koike, Ashigarakami-gun (JP); Yasunori Ichikawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 435 days.

(21) Appl. No.: 13/072,158

(22) Filed: Mar. 25, 2011

(65) Prior Publication Data

US 2011/0236285 A1 Sep. 29, 2011

(30) Foreign Application Priority Data

Mar. 26, 2010 (JP) ................................. 2010-072515
Feb. 4, 2011 (JP) ................................. 2011-023212

(51) Int. Cl.
| | | |
|---|---|---|
| C22B 3/00 | (2006.01) | |
| C01F 17/00 | (2006.01) | |
| C01F 1/00 | (2006.01) | |
| C01F 5/00 | (2006.01) | |
| C01F 11/00 | (2006.01) | |
| C22B 26/20 | (2006.01) | |
| C01F 5/02 | (2006.01) | |
| C01F 5/14 | (2006.01) | |
| C01F 11/02 | (2006.01) | |
| C01B 13/14 | (2006.01) | |
| B01J 8/02 | (2006.01) | |
| C09K 21/00 | (2006.01) | |

(52) U.S. Cl.
USPC .............. 423/1; 423/21.1; 423/155; 423/263; 423/635; 423/639; 423/659; 252/601

(58) Field of Classification Search
USPC ............ 423/21.1, 155, 263, 635, 636, 659, 1, 423/592.1, 639; 252/601
See application file for complete search history.

(56) References Cited

U.S. PATENT DOCUMENTS

| | | | |
|---|---|---|---|
| 4,312,765 A | | 1/1982 | Block |
| 4,698,379 A | * | 10/1987 | Nakaya et al. ................ 523/513 |
| 4,789,494 A | | 12/1988 | Aoki et al. |
| 5,422,092 A | * | 6/1995 | Miyata .......................... 423/635 |

(Continued)

FOREIGN PATENT DOCUMENTS

| | | |
|---|---|---|
| JP | 08012324 A | 1/1996 |
| JP | 2005171036 A | 6/2005 |
| WO | 2005047184 A1 | 5/2005 |
| WO | 2008/120746 A1 | 10/2008 |

OTHER PUBLICATIONS

Communication, dated Jun. 24, 2011, issued in corresponding EP Application No. 11159539.3, 5 pages.

(Continued)

*Primary Examiner* — Anthony J Zimmer
(74) *Attorney, Agent, or Firm* — Sughrue Mion, PLLC

(57) ABSTRACT

An object of the present invention is to provide a method for producing a metal hydroxide fine particle, which can produce metal hydroxide fine particles with favorable crystallinity and small particle sizes. The present invention provides a method for producing a metal hydroxide fine particle by reacting a metal ion with a hydroxide ion in a solvent, which includes a mixing and reacting step of supplying the metal ion, the hydroxide ion, and a silane coupling agent to a reaction field to mix and react the ions.

9 Claims, 17 Drawing Sheets

AMOUNT OF SILANE COUPLING AGENT ADDED (mol%)

(56) References Cited

U.S. PATENT DOCUMENTS

| | | | |
|---|---|---|---|
| 5,573,582 A | 11/1996 | Inui et al. | |
| 6,025,424 A * | 2/2000 | Katsuki et al. | 524/436 |
| 6,676,920 B1 * | 1/2004 | Oishi et al. | 423/635 |
| 7,060,246 B2 * | 6/2006 | Oishi et al. | 423/635 |
| 7,901,657 B2 * | 3/2011 | Arpac et al. | 423/592.1 |
| 2007/0082978 A1 | 4/2007 | Suzuki et al. | |

OTHER PUBLICATIONS

Rodorico Giorgi, et al., "Nanoparticles of Mg(OH): Synthesis and Application to Paper Conservation", Langmuir, Aug. 6, 2005, pp. 8495-8501, vol. 21, No. 18.

Notification of Reasons for Rejection, dated Feb. 28, 2014, issued in corresponding JP Application No. 2011-023212, 8 pages in English and Japanese.

* cited by examiner

FIG.16A

| | TYPE OF PARTICLE | REACTION SYSTEM | SILANE COUPLING AGENT (mol%) |
|---|---|---|---|
| EXAMPLE 2-1 | Mg(OH)$_2$ | BATCH | 0.03 |
| EXAMPLE 2-2 | Mg(OH)$_2$ | BATCH | 0.3 |
| EXAMPLE 2-3 | Mg(OH)$_2$ | BATCH | 3.2 |
| EXAMPLE 2-4 | Mg(OH)$_2$ | BATCH | 12.9 |
| EXAMPLE 2-5 | Mg(OH)$_2$ | MICROREACTOR | 0.02 |
| EXAMPLE 2-6 | Mg(OH)$_2$ | MICROREACTOR | 0.3 |
| EXAMPLE 2-7 | Mg(OH)$_2$ | MICROREACTOR | 3.2 |
| EXAMPLE 2-8 | Mg(OH)$_2$ | MICROREACTOR | 6.4 |
| EXAMPLE 2-9 | Mg(OH)$_2$ | MICROREACTOR | 12.9 |
| EXAMPLE 2-10 | La(OH)$_3$ | MICROREACTOR | 0.01 |
| EXAMPLE 2-11 | La(OH)$_3$ | MICROREACTOR | 1.1 |
| EXAMPLE 2-12 | La(OH)$_3$ | MICROREACTOR | 10.6 |
| EXAMPLE 2-13 | La(OH)$_3$ | MICROREACTOR | 21.2 |
| EXAMPLE 2-14 | La(OH)$_3$ | MICROREACTOR | 31.8 |
| EXAMPLE 2-15 | Ca(OH)$_2$ | MICROREACTOR | 2.1 |
| EXAMPLE 2-16 | Ca(OH)$_2$ | MICROREACTOR | 4.1 |
| EXAMPLE 2-17 | Ca(OH)$_2$ | MICROREACTOR | 8.3 |
| EXAMPLE 2-18 | Ca(OH)$_2$ | MICROREACTOR | 16.5 |
| COMPARATIVE EXAMPLE 2-1 | Mg(OH)$_2$ | BATCH | 0 |
| COMPARATIVE EXAMPLE 2-2 | Mg(OH)$_2$ | MICROREACTOR | 0 |
| COMPARATIVE EXAMPLE 2-3 | La(OH)$_3$ | MICROREACTOR | 0 |
| COMPARATIVE EXAMPLE 2-4 | Ca(OH)$_2$ | MICROREACTOR | 0 |

*FWHM1 FOR c PLANE (001), FWHM2 FOR ab PLANE (110) *ONLY La(OH)$_3$, FWHM2 FOR a PLANE (100)

FIG.16B

| | VOLUME AVERAGE PARTICLE SIZE MV (nm) | FULL WIDTH AT HALF MAXIMUM FWHM1 | FULL WIDTH AT HALF MAXIMUM FWHM2 |
|---|---|---|---|
| EXAMPLE 2-1 | 40.3 | 1.48 | 0.56 |
| EXAMPLE 2-2 | 38.7 | 1.69 | 0.58 |
| EXAMPLE 2-3 | 31.1 | 1.76 | 0.6 |
| EXAMPLE 2-4 | 22.6 | 1.93 | 0.61 |
| EXAMPLE 2-5 | 25.7 | 1.45 | 0.55 |
| EXAMPLE 2-6 | 25.8 | 1.49 | 0.56 |
| EXAMPLE 2-7 | 23.4 | 1.69 | 0.58 |
| EXAMPLE 2-8 | 22.1 | 1.89 | 0.63 |
| EXAMPLE 2-9 | 20.3 | 2.19 | 0.67 |
| EXAMPLE 2-10 | 22 | – | 1.33 |
| EXAMPLE 2-11 | 16.9 | – | 1.33 |
| EXAMPLE 2-12 | 18.1 | – | 1.33 |
| EXAMPLE 2-13 | 17.5 | – | 1.35 |
| EXAMPLE 2-14 | 15.1 | – | 1.36 |
| EXAMPLE 2-15 | 186.8 | 0.97 | 0.34 |
| EXAMPLE 2-16 | 133.4 | 1.48 | 0.53 |
| EXAMPLE 2-17 | 130.9 | 1.8 | 0.54 |
| EXAMPLE 2-18 | 102.9 | 1.56 | 0.58 |
| COMPARATIVE EXAMPLE 2-1 | 36.6 | 1.48 | 0.57 |
| COMPARATIVE EXAMPLE 2-2 | 23.9 | 1.68 | 0.59 |
| COMPARATIVE EXAMPLE 2-3 | EXCESSIVELY STRONG AGGREGATION FAILED TO FORM FINE PARTICLES | | |
| COMPARATIVE EXAMPLE 2-4 | *ONLY La(OH)3, | | |

*FWHM1 FOR c PLANE (001), FWHM2 FOR ab PLANE (110)   *ONLY La(OH)3, FWHM2 FOR a PLANE (100)

METHOD FOR PRODUCING METAL HYDROXIDE FINE PARTICLE

BACKGROUND OF THE INVENTION

1. Field of the Invention

The present invention relates to a method for producing a metal hydroxide fine particle, and more particularly, relates to a method for producing a metal hydroxide fine particle, which allows the crystallinity and particle size to be controlled.

2. Description of the Related Art

Conventionally, polymer materials, thermoplastic resins have been used in a variety of fields as materials such as electric and electronic device components and materials for chassis. When a polymer material is used for an exterior material of office automation equipment such as televisions and personal computers, flame retardancy is required for the polymer material used in terms of safety.

As a method for providing polymer materials with flame retardancy, the addition of a flame retardant to the polymer materials has been carried out. Typical flame retardants include flame retardants of halogen series, phosphorus series, and inorganic particle series. However, the flame retardants of halogen series have a lot of environmental problems such as halogen gas from burning, generation of black smoke, and generation of dioxin during incineration. In addition, the flame retardants of phosphorus series also have environmental problems such as generation of phosphine gas, and further have problems such as high cost and concern with supply of phosphate rock as a raw material.

In contrast to these flame retardants, magnesium hydroxide fine particles of a metal hydroxide as a typical example of the flame retardants of inorganic particle series cause no harm, and have few environmental problems. Furthermore, the magnesium hydroxide fine particles have features such as inexpensiveness and an abundance of raw material resources, which can solve the problems with each of the flame retardants of halogen series and the flame retardants of phosphorus series.

For example, Rodorico Giorgi, Claudio Bozzi, Luigi Dei, Chiara Gabbiani, Barry W. Ninham, and Piero Baglioni Langmuir 2005, 21, 8495 discloses a method for producing a magnesium hydroxide as a metal hydroxide. Rodorico Giorgi, Claudio Bozzi, Luigi Dei, Chiara Gabbiani, Barry W. Ninham, and Piero Baglioni Langmuir 2005, 21, 8495 discloses the importance of the selection of an ion which pairs with magnesium and the reaction temperature in the case of a magnesium salt solution in order to control the properties of magnesium hydroxide fine particles, and the selection and reaction temperature which have influences on the crystal size, etc.

SUMMARY OF THE INVENTION

In order to improve the flame retardancy of a metal hydroxide, it is necessary to improve the crystallinity of the metal hydroxide. This is because the case of favorable crystallinity provides flattened crystals, which are likely to develop a dehydration reaction. In addition, the metal hydroxide added to polymer materials preferably has a small particle size. The reasons include the fact that: (1) the increased surface area of particles promotes an endothermic dehydration reaction developed on the particle surface; and (2) the uniform dispersion in resin reduces the distance between particles to form a uniform carbide layer and increase the ability to block flammable gas.

However, in the case of the method disclosed in Rodorico Giorgi, Claudio Bozzi, Luigi Dei, Chiara Gabbiani, Barry W. Ninham, and Piero Baglioni Langmuir 2005, 21, 8495, the obtained magnesium hydroxide shows a wide particle size distribution, thereby resulting in a failure to obtain small particle sizes. In addition, the method also has the problem of particle aggregation because of the synthesis at high temperatures for a long period of time.

In view of these actual conditions, an object of the present invention is to provide a method for producing a metal hydroxide fine particle, which can produce metal hydroxide fine particles with favorable crystallinity and small particle sizes.

The object of the present invention can be achieved by the following aspects of the present invention.

More specifically, a method for producing a metal hydroxide fine particle according to the present invention is a method for producing a metal hydroxide fine particle by reacting a metal ion with a hydroxide ion in a solvent, and a main feature of the method is including a mixing and reacting step of supplying the metal ion, the hydroxide ion, and a silane coupling agent to a reaction field to mix and react the ions.

The silane coupling agent thus serves as extremely minute nucleuses for the precipitation of the metal hydroxide, thereby allowing for the formation of minute particles, and also allows fine particles with favorable crystallinity to be obtained.

In addition, another main feature of the method for producing a metal hydroxide fine particle according to the present invention is that the silane coupling agent is supplied to the reaction field in the range of 3.2 mol % to 16.2 mol % with respect to the metal ion.

This range allows minute metal hydroxide fine particles with favorable crystallinity to be obtained.

Furthermore, another main feature of the method for producing a metal hydroxide fine particle according to the present invention is that the ratio of the number of moles of the hydroxide ion to the number of moles of the metal ion is adapted to be not less than the value of the valence of the metal ion. This value of the ratio has the advantageous effect of preventing the rate of reaction from being decreased, and thus preventing coarse particles or secondary aggregated particles from being formed due to a decrease in nucleation rate.

In addition, another main feature of the method for producing a metal hydroxide fine particle according to the present invention is that the concentration of the metal ion is 0.2 mol/L or more in the solvent. This concentration can increase the collision probability of ions in the reaction, and thus increase the rate of reaction.

Furthermore, another main feature of the method for producing a metal hydroxide fine particle according to the present invention is that a step of carrying out a purification treatment, a step of carrying out a surface preparation, a step of carrying out a heat treatment, and a step of carrying out a drying treatment are carried out in this order after the reacting step.

These steps in the order can prevent aggregation of generated fine particles, and thus eliminate the need for a dispersion treatment after the drying.

Furthermore, another main feature of the method for producing a metal hydroxide fine particle according to the present invention is that the metal ion is a magnesium ion. This magnesium ion has the advantageous effect of reducing the concern with decomposition during resin kneading and thus extending the range of application of resin, because the decomposition temperature of the particle can be increased.

The method for producing a metal hydroxide fine particle according to the present invention can produce metal hydroxide fine particles with favorable crystallinity and small particle sizes.

BRIEF DESCRIPTION OF THE DRAWINGS

FIG. 16A is a diagram which lists conditions for producing metal hydroxides and the measurement results of volume average particle sizes and full widths at half maximum;

FIG. 16B is another diagram which lists conditions for producing metal hydroxides and the measurement results of volume average particle sizes and full widths at half maximum.

DETAILED DESCRIPTION OF THE PREFERRED EMBODIMENTS

Embodiments of the present invention will be described below in detail with reference to the accompanying drawings. While a reaction example of using a microreactor as a reactor in which a magnesium hydroxide is precipitated from a magnesium chloride solution and a sodium hydroxide solution will be described as an embodiment of the present invention, it will be understood that the present invention can be applied to other reactors than microreactors such as, for example, a typical chemical reactor for use in a batch mixing method. In addition, it comes near to stating the obvious that the present invention is not to be considered limited to the reaction for precipitating magnesium hydroxide from a magnesium chloride solution and a sodium hydroxide solution.

The parts designated by the same symbols in the figures refer to like elements which have like functions. In addition, when a numerical range is represented by the phrase "A to B" in the specification, the numerical range is intended to encompass the numerical values of the upper limit and lower limit represented by the phrase "A to B".

<Reactor>

Figure 1:
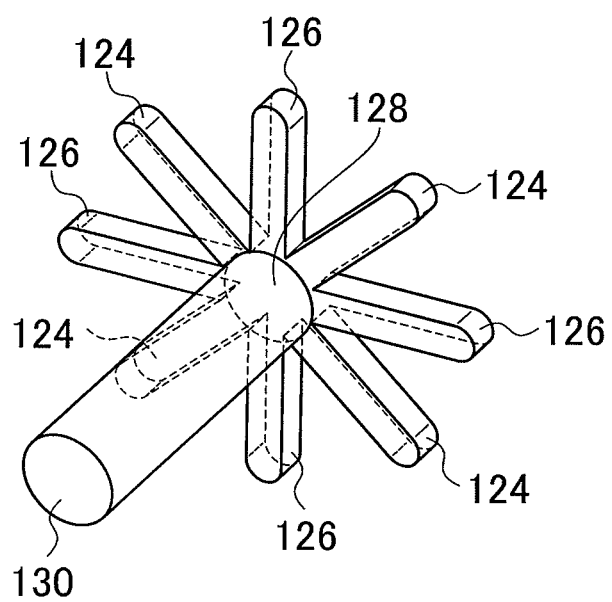
FIG. 1 is a schematic view of a flow channel of a microreactor.
Figure 2:
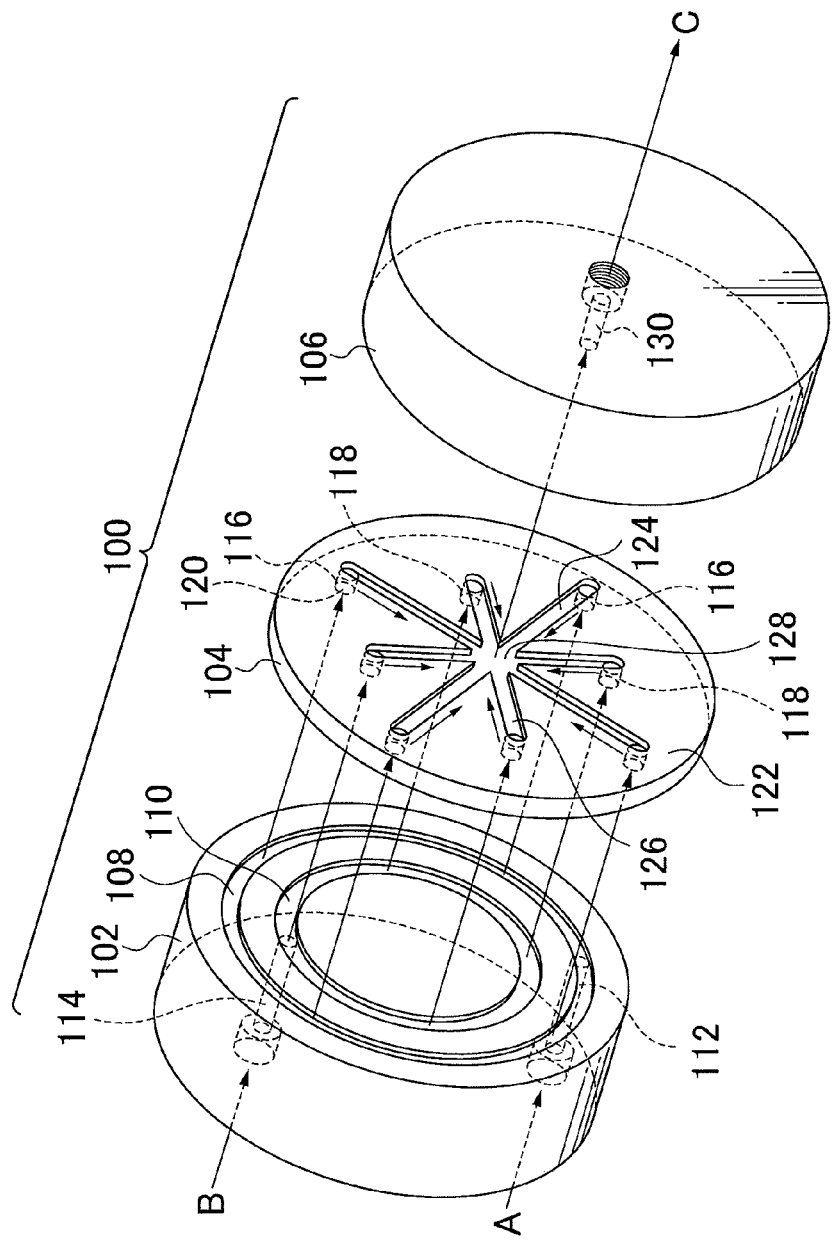
FIG. 2 is an exploded perspective view of the microreactor.

A microreactor for use in the practice of the present invention will be described with reference to the drawings. FIG. 1 is a schematic view of a flow channel of the microreactor. FIG. 2 is an exploded perspective view of the microreactor.

As shown in FIG. 1, the flow channel of the microreactor for use in the present invention is configured to include a flow channel 124 composed of four flow channels, a flow channel 126 likewise composed of four flow channels, a mixing section 128, and a bore 130 as a part of a discharge flow channel.

When a magnesium chloride solution and a sodium hydroxide solution are supplied to the flow channel 126 and the flow channel 124 respectively, these solutions are mixed in the mixing section 128, reacted in the bore 130 as a part of the discharge flow channel to start the precipitation of magnesium hydroxide.

Now, a further explanation will be given with reference to FIG. 2. As shown in FIG. 2, a microreactor 100 for use in the practice of the present invention is composed of a supply element 102, an interflow element 104, and a discharge element 106, which are each in a cylindrical form. In the case of constituting the microreactor, these elements are put together and assembled so as to have a cylindrical shape. For this assembly, for example, the peripheral section of each element may be provided with bores (or holes, not shown) penetrating through the cylinder at regular intervals to put together these elements with bolts/nuts.

The surface of the supply element 102 opposed to the interflow element 104 has annular flow channels 108 and 110 formed in a concentric fashion, which are rectangular in cross section. In the embodiment shown in FIG. 2, bores 112 and 114 are formed which penetrate through the supply element 102 in the thickness (or height) direction to reach the respective annular flow channels.

The interflow element 104 has bores 116 formed to penetrate therethrough in the thickness direction. The bores 116 are adapted such that ends 120 of the bores 116 located in the surface of the interflow element opposed to the supply element open into the annular flow channel 108 when the elements are put together to constitute the microreactor. In the embodiment shown in FIG. 2, the four bores 116 formed are arranged at regular intervals in a circumferential direction of the annular flow channel 108.

The interflow element 104 has bores 118 formed to penetrate therethrough as in the case of the bores 116. The bores 118 are also formed so as to open into the annular flow channel 110, as in the case of the bores 116. In the embodiment shown in FIG. 2, the bores 118 are also arranged at regular intervals in a circumferential direction of the annular flow channel 110, and arranged in such a way that the bores 116 and the bores 118 are located alternately.

In a surface 122 of the interflow element 104 opposed to the discharge element 106, micro flow channels 124 and 126 are formed. The micro flow channel 124 or 126 has one end constituting the opening of the bore 116 or 118, and the other end constituting the mixing section 128 located in the center of the surface 122, and all of the micro flow channels extend from the bores toward the mixing section 128 to unite in the mixing section 128. The micro flow channels may have, for example, a rectangular cross section.

The discharge element 106 has a bore 130 formed to penetrate through the center thereof in the thickness direction. Accordingly, this bore has one end opening into the mixing section 128 of the interflow element 104, and the other end opening into the outside of the microreactor.

As can be easily understood, the annular flow channels 108 and 110 correspond to supply flow channels of the microreactor according to the present invention, and a sodium hydroxide solution and a magnesium chloride solution supplied as a stream A and a stream B respectively at the ends of the bores 112 and 114 respectively from the outside of the microreactor flow through the bores 112 and 114 respectively into the annular flow channels 108 and 110 respectively.

The annular flow channel 108 is communicated with the bores 116, and the sodium hydroxide solution flowing into the annular flow channel 108 thus flows through the bores 116 into the micro flow channels 124. Furthermore, the annular flow channel 110 is communicated with the bores 118, and the magnesium chloride solution flowing into the annular flow channel 110 thus flows through the bores 118 into the micro flow channels 126. As is clear, the sodium hydroxide solution and the magnesium chloride solution are divided into four in the interflow element 104 to flow into the micro flow channels 124 and 126 respectively, and then flow toward the mixing section 128.

The central axis of the micro flow channels 124 and the central axis of the micro flow channels 126 intersect with each other at the mixing section 128. The united fluid is discharged as a stream C through the bore 130 to the outside of the microreactor. Accordingly, the bore 130 corresponds to a discharge channel of the microreactor according to the present invention.

It is to be noted that for the manufacture of the microreactor 100 shown in FIG. 2, in particular, for the manufacture of the respective elements, semiconductor processing techniques, in particular, precision machining techniques can be used such as etching (for example, photolithographic etching) processing, microelectrodischarge machining, rapid prototyping, a mirror finishing technique, and a diffusion bonding technique, and machining techniques using a versatile turning machine or drilling machine can also be used, and one skilled in the art can easily manufacture the elements.

The materials used for the microreactor 100 are not to be considered limited particularly, and may be any materials as long as the processing techniques mentioned above can be applied to the materials, and as long as the materials are not affected by the fluids to be united. Specifically, metal materials (iron, aluminum, stainless steel, titanium, various types of alloys, etc.), resin materials (fluorine resin, acrylic resin, etc.), and glass (silicon, quartz, etc.) can be used.

This microreactor has respective dimensions as follows:
The cross-sectional shape, width, depth, and diameter of the annular flow channel 108:
Rectangular cross section; 1.5 mm, 1.5 mm, and 25 mm
The cross-sectional shape, width, depth, and diameter of the annular flow channel 110:
Rectangular cross section; 1.5 mm, 1.5 mm, and 25 mm
The diameter and length of the bore 112: 1.5 mm and 10 mm (circular cross section)
The diameter and length of the bore 114: 1.5 mm and 10 mm (circular cross section)
The diameter and length of the bore 116: 0.5 mm and 4 mm (circular cross section)
The diameter and length of the bore 118: 0.5 mm and 4 mm (circular cross section)
The cross-sectional shape, width, depth, and length of the micro flow channel 124:
Rectangular cross section; 200 μm, 200 μm, and 12.5 mm
The cross-sectional shape, width, depth, and length of the micro flow channel 126:
Rectangular cross section; 200 μm, 200 μm, and 10 mm
The diameter and length of the bore 130: 500 μm and 10 mm (circular cross section)

<Production Method for Metal Hydroxide Fine Particle>

Next, a case of producing magnesium hydroxide from a sodium hydroxide solution and a magnesium chloride solution will described as an example with reference to an embodiment of the method for producing a metal hydroxide fine particle according to the present invention.

In the case of explanation with reference to FIG. 1, a mixed solution of a magnesium chloride solution and a silane coupling agent (3-aminopropyl trimethoxysilane) is supplied to the flow channels 126, whereas a sodium hydroxide solution is supplied to the flow channels 124. The solutions supplied to the flow channels 126 and the flow channels 124 are mixed in the mixing section 128, and discharged through the bore 130 as a discharge flow channel to the outside of the microreactor. Thus, the reaction is developed in the mixing section 128 and the bore 130, thereby providing a slurry of magnesium hydroxide.

Next, the method for producing a metal hydroxide fine particle according to the present invention will be further described. For the method for producing a metal hydroxide fine particle according to the present invention, a bittern-seawater method can be used in which a magnesium salt such as, for example, magnesium chloride and a hydroxide salt such as sodium hydroxide are each dissolved in solvents in advance, and mixed. It is a feature of the present invention to supply a low molecular weight compound having a hydroxyl group, which is commonly called a surface preparation agent (referred to as a surface preparation agent in the present invention), such as a silane coupling agent, a titanate coupling agent, or an aluminate coupling agent, to the reaction field in this bittern-seawater method.

These surface preparation agents have an extremely high affinity for the metal hydroxide as a reaction product, and crystal growth is believed to be developed building upon molecules of the surface preparation agent. Therefore, the amount of molecules of the surface preparation agent introduced can control the number of nucleuses at the beginning of the reaction, thereby allowing both the particle size and the crystallinity to be controlled. The surface preparation agent may be introduced by itself to the reaction field, or put in advance into a solvent with a magnesium salt dissolved.

The microreactor described above can be used to mix the solutions and develop the reaction, thereby providing finer magnesium hydroxide. In this case, for example, as shown in FIG. 1, a magnesium chloride solution and a sodium hydroxide solution are introduced into the flow channels 126 and the flow channels 124 respectively, and thereby mixed in the mixing section 128, and the reaction is developed in the bore 130 as a discharge flow channel to start the precipitation of a magnesium hydroxide.

As described above, the use of the microreactor can achieve the unidirectional flow field in the discharge flow channel, thus producing the effect of preventing aggregation. It is to be noted that while the present invention has been described with reference to the structure shown in FIG. 1 as an example, the microreactor for use in the present invention is not to be considered limited to a specific structure in any way. In addition, while microreactors can be preferably used as the reactor as described above, the present invention is not to be considered limited to microreactors, it is also possible to use, for example, typical chemical reactors as used in a batch mixing method, etc., and a sufficient effect can be provided even in the case of using the chemical reactors.

In the reacting step, the mixing ratio between magnesium chloride and sodium hydroxide is preferably 1:2 or more in terms of molar ratio, at which the sodium hydroxide is mixed. This is because a magnesium ion has a valence of 2, whereas a hydroxide ion has a valence of 1, and thus, unless there are twice or more as many hydroxide ions as magnesium ions during the synthesis, the rate of reaction will be extremely decreased to lead to a decrease in nucleation rate, and the formation of coarse particles or secondary aggregated particles.

In addition, in terms of collision probability of ions, the concentrations are preferably higher during the synthesis. This is because if the concentrations are lower during the synthesis, the collision probability will be decreased between the magnesium ions and the hydroxide ions in the synthesis field, thereby leading to a decrease in reaction rate. Specifically, the concentration of magnesium ion as a metal ion is preferably 0.2 mol/L or more in a solvent during the synthesis, and more preferably 0.5 mol/L or more. In the case of expressing the magnesium hydroxide concentration after the reaction, the magnesium hydroxide concentration after the reaction is preferably 0.1 mol/L or more, and more preferably 0.3 mol/L or more.

As the surface preparation agent supplied to the reaction field, specifically, at least one surface preparation agent selected from higher fatty acids, alkali metal salts of higher fatty acids, polyalcohol higher fatty acid esters, anionic surfactants, phosphate ester, silane coupling agents, aluminum coupling agents, titanate coupling agents, organosilanes, organosiloxanes, and organosilazanes can be introduced during the synthesis to achieve the object of the present invention.

In particular, the silane coupling agents, the aluminum coupling agents, and the titanate coupling agents are more preferable in terms of adhesion between the preparation agent and the particles, and the silane coupling agents are particularly preferable in that various functional groups can be selected. The amount of the surface preparation agent supplied to the reaction field preferably falls within the range of 0.1 weight % to 100 weight % with respect to the intended metal hydroxide fine particle, more preferably within the range of 0.5 weight % to 80 weight %, most preferably within the range of 2 weight % to 50 weight %. This range can achieve the reduction in the particle size of the intended metal hydroxide fine particle and achieve higher crystallinity.

In addition, expressed in another way, the amount of the surface preparation agent supplied to the reaction field preferably falls within the range of 3.2 mol % to 16.2 mol % with respect to the metal ions in the solvent, more preferably within the range of 6.5 mol % to 16.2 mol %, and most preferably within the range of 6.5 mol % to 9.7 mol %. This range can achieve the reduction in the particle size of the intended metal hydroxide fine particle and higher crystallinity. The mentioned range of the supplied amount of the surface preparation agent can be applied not only to the reaction of producing magnesium hydroxide from a sodium hydroxide solution and a magnesium chloride solution, but also generally to reactions of obtaining metal hydroxides by the reaction of metal ions with hydroxide ions.

The metal hydroxide fine particles such as magnesium hydroxide fine particles, which are obtained according to the present invention, can be subjected to a heat treatment, in particular, heated to a high temperature in water to improve the flame retardancy. The reason is that the heat treatment for the magnesium hydroxide fine particles promotes crystallization of the magnesium hydroxide fine particles to flatten the particles, thereby resulting in an increase in the surface area of the particles, and thus allowing an endothermic dehydration reaction to be promoted during burning. While the temperature and time for the heat treatment are not particularly limited, the heat treatment is preferably carried out at 120° C. for 8 hours or more, more preferably 80° C. for 8 hours. This is because the crystallinity remains unchanged even when the temperature is increased to a certain temperature or more, and the lower temperature is preferable in terms of energy and cost.

In the heat treatment, the particles are aggregated. Therefore, after the precipitation of the metal hydroxide fine particle, a purification treatment is preferably carried out before carrying out the heat treatment. More specifically, while the order of reaction→heat treatment→surface preparation→purification→drying has been employed conventionally, the order of reaction→purification→surface preparation→heat treatment→drying prevents aggregation and thus eliminates the need for a dispersion treatment after the drying.

Here, the purification treatment refers to a step of removing a salt as a by-product produced in the reaction. Methods for the purification include filtration methods using a membrane, sedimentation methods using centrifugal force, and electrodialytic methods using electrostatic force.

In addition, the surface preparation refers to a step of stabilizing the surfaces of the metal hydroxide fine particles. While at least one selected from higher fatty acids, alkali metal salts of higher fatty acids, polyalcohol higher fatty acid esters, anionic surfactants, phosphate ester, silane coupling agents, aluminum coupling agents, titanate coupling agents, organosilanes, organosiloxanes, and organosilazanes can be used as the surface preparation agent, the silane coupling agents, the aluminum coupling agents, and the titanate coupling agents can be preferably used in terms of adhesion between the surface preparation agent and the particles, and in particular, the silane coupling agents can be preferably used because various functional groups can be selected.

While examples of the surface preparation method include a wet process in which a silane coupling agent is put into a slurry solution with particles suspended in a solvent and a dry process in which a silane coupling agent is put in dry particles being stirred at high speed, the wet process is particularly preferable which can process particle surfaces uniformly.

Furthermore, the heat treatment refers to a step of applying a hydrothermal treatment to the metal hydroxide fine particles to promote crystallization of the metal hydroxide fine particles. This step flattens the metal hydroxide fine particles to increase the specific surface area thereof, and the improvement in flame retardancy can be thus expected when the metal hydroxide fine particles are used as a flame retardant. The specific heating method is carried out by heating a slurry solution in which particles are suspended at a high temperature for a long period of time while stirring.

In addition, the drying refers to a step of removing a solvent from a suspension of the metal hydroxide fine particles in the solvent. The removal of the solvent can expect to reduce the transportation cost and extend the range of application of resin. While common methods such as drying by heating, vacuum drying, centrifugal drying, spray drying, and freeze-drying methods can be used as the drying method, in particular, the freeze-drying method which can separate the solvent and the particles from each other by sublimation during the drying is more preferable because the use of the freeze-drying method can controls the surface tension of the solvent during the drying to improve the redispersibility.

Furthermore, the dispersion treatment refers to a step of reducing the particle sizes by grinding secondary aggregated particles of the metal hydroxide fine particles which have been aggregated in the steps from the synthesis to the drying. In general, the finer the primary particle sizes of the metal hydroxide fine particles, the more the surface energy is increased, thus making it difficult to disperse the aggregate only by the shear force during resin kneading. Therefore, high energy applied in advance to the secondary aggregate to release the aggregation allows uniform dispersion into resin without aggregation.

Examples of the dispersing method include a milling method in which high shear is applied in the presence of metal hydroxide particles and inorganic particles to grind the metal hydroxide particles with the inorganic particles, a high-pressure dispersion method of causing metal hydroxide particles accompanied with a jet stream to collide against particles or a solid wall for grinding, and an ultrasonic method of irradiating metal hydroxide particles with ultrasonic waves for grinding.

Since the dispersion treatment requires high dispersion energy for high pressure and high-speed shearing, the elimination of the need for the dispersion treatment eliminates the need for the supply of high energy, and thus allows cost reduction.

In addition, since the surface preparation agent introduced during the reaction is consumed in the reaction, the further addition of the surface preparation agent in the surface preparation step can prevent aggregation effectively.

[Evaluation 1]

Next, as Evaluation 1, an experiment was carried out in which a microreactor was used to produce magnesium hydroxide fine particles while varying the amount of a silane coupling agent added. The experiment will be described below in detail.

<Example 1-1>

A magnesium chloride aqueous solution adjusted in advance to 0.5 mol/L with 3-aminopropyl trimethoxysilane mixed at 3.2 mol % with respect to the magnesium ions and a sodium hydroxide aqueous solution adjusted to 3 mol/L were mixed at flow ratios of 200 cc/min and 100 cc/min respectively with each other in a microreactor at room temperature to obtain a slurry of magnesium hydroxide. The obtained slurry was subjected to purification by washing with water until the salt concentration reached 0.00%, thereby providing a dispersion of magnesium hydroxide fine particles in water. The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide a.

<Example 1-2>

A magnesium chloride aqueous solution adjusted in advance to 0.5 mol/L with 3-aminopropyl trimethoxysilane mixed at 6.5 mol % with respect to the magnesium ions and a sodium hydroxide aqueous solution adjusted to 3 mol/L were mixed at flow ratios of 200 cc/min and 100 cc/min respectively with each other in a microreactor at room temperature to obtain a slurry of magnesium hydroxide. The obtained slurry was subjected to purification by washing with water until the salt concentration reached 0.00%, thereby providing a dispersion of magnesium hydroxide fine particles in water. The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide b.

<Example 1-3>

A magnesium chloride aqueous solution adjusted in advance to 0.5 mol/L with 3-aminopropyl trimethoxysilane mixed at 9.7 mol % with respect to the magnesium ions and a sodium hydroxide aqueous solution adjusted to 3 mol/L were mixed at flow ratios of 200 cc/min and 100 cc/min respectively with each other in a microreactor at room temperature to obtain a slurry of magnesium hydroxide. The obtained slurry was subjected to purification by washing with water until the salt concentration reached 0.00%, thereby providing a dispersion of magnesium hydroxide fine particles in water. The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide c.

<Example 1-4>

A magnesium chloride aqueous solution adjusted in advance to 0.5 mol/L with 3-aminopropyl trimethoxysilane mixed at 12.9 mol % with respect to the magnesium ions and a sodium hydroxide aqueous solution adjusted to 3 mol/L were mixed at flow ratios of 200 cc/min and 100 cc/min respectively with each other in a microreactor at room temperature to obtain a slurry of magnesium hydroxide. The obtained slurry was subjected to purification by washing with water until the salt concentration reached 0.00%, thereby providing a dispersion of magnesium hydroxide fine particles in water.

The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide d.

<Example 1-5>

A magnesium chloride aqueous solution adjusted in advance to 0.5 mol/L with 3-aminopropyl trimethoxysilane mixed at 16.2 mol % with respect to the magnesium ions and a sodium hydroxide aqueous solution adjusted to 3 mol/L were mixed at flow ratios of 200 cc/min and 100 cc/min respectively with each other in a microreactor at room temperature to obtain a slurry of magnesium hydroxide. The obtained slurry was subjected to purification by washing with water until the salt concentration reached 0.00%, thereby providing a dispersion of magnesium hydroxide fine particles in water. The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide e.

<Comparative Example 1-1>

A magnesium chloride aqueous solution adjusted in advance to 0.5 mol/L and a sodium hydroxide aqueous solution adjusted to 3 mol/L were mixed at flow ratios of 200 cc/min and 100 cc/min respectively with each other in a microreactor at room temperature to obtain a slurry of magnesium hydroxide. The obtained slurry was subjected to purification by washing with water until the salt concentration reached 0.00%, thereby providing a dispersion of magnesium hydroxide fine particles in water. The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide f.

<Measurement of Particle Size and Distribution>

Microtrac UPA (from NIKKISO CO., LTD.) was used to measure the particle sizes and distributions of the magnesium hydroxide fine particles obtained according to Example 1-1 to Example 1-5 and Comparative Example 1-1.

Conditions for Measurement of Particle Size and Distribution
  Solvent: Water (Refractive Index Parameter: 1.33)
  Particle: $Mg(OH)_2$ (Refractive Index Parameter: 1.57, Density Parameter: 2.36 g-m/cm$^3$)
  Loading index: adjusted in the range of 0.1 to 1

Figure 3:
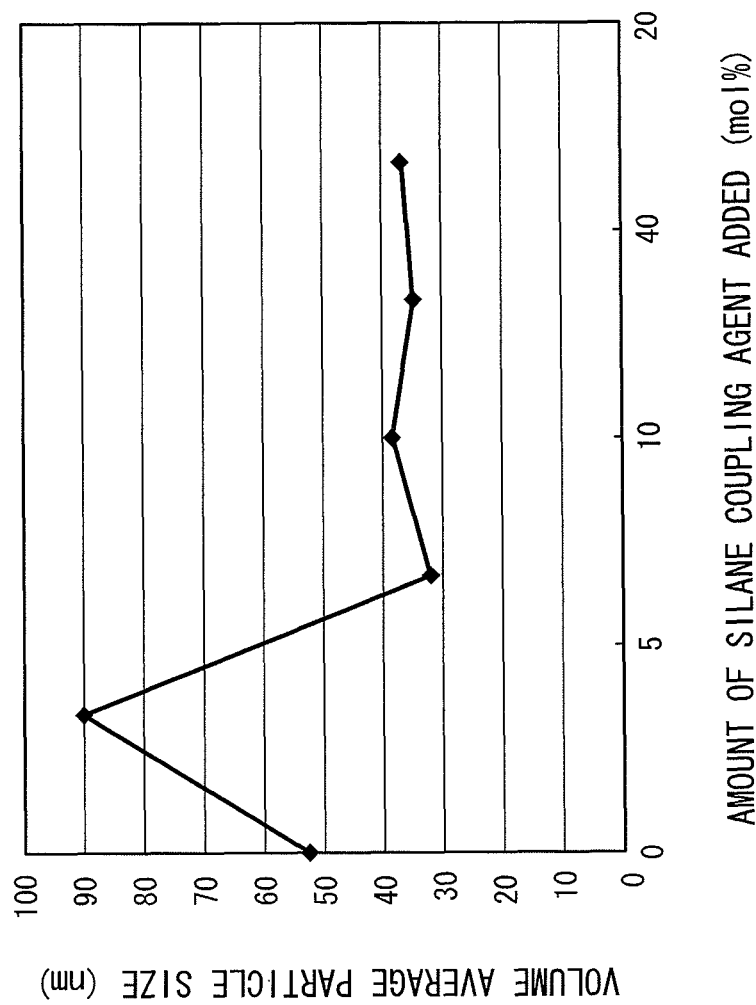
FIG. 3 is a graph showing the relationship between the amount of a silane coupling agent added and the volume average particle size (MV)

FIG. 3 was created which is a graph indicating the obtained volume average particle size (MV) on the Y axis and the amount of the silane coupling agent added to the reaction field on the X axis. FIG. 3 is a graph showing the relationship between the amount of the silane coupling agent added to the reaction field and the volume average particle size (MV).

<Measurement of Crystallinity>

An X-ray diffractometer RINT 2000 (from Rigaku Corporation) was used to carry out X-ray diffraction measurements for the magnesium hydroxide fine particles obtained according to Example 1-1 to Example 1-5 and Comparative Example 1-1.

Conditions for X-ray Diffraction
  Radiation source: $CuK\alpha 1$ ($\lambda=1.54056$)
  Voltage: 55 kV
  Current: 280 mA
  Measuring Range: 10 to 80° @2θ

Figure 4:
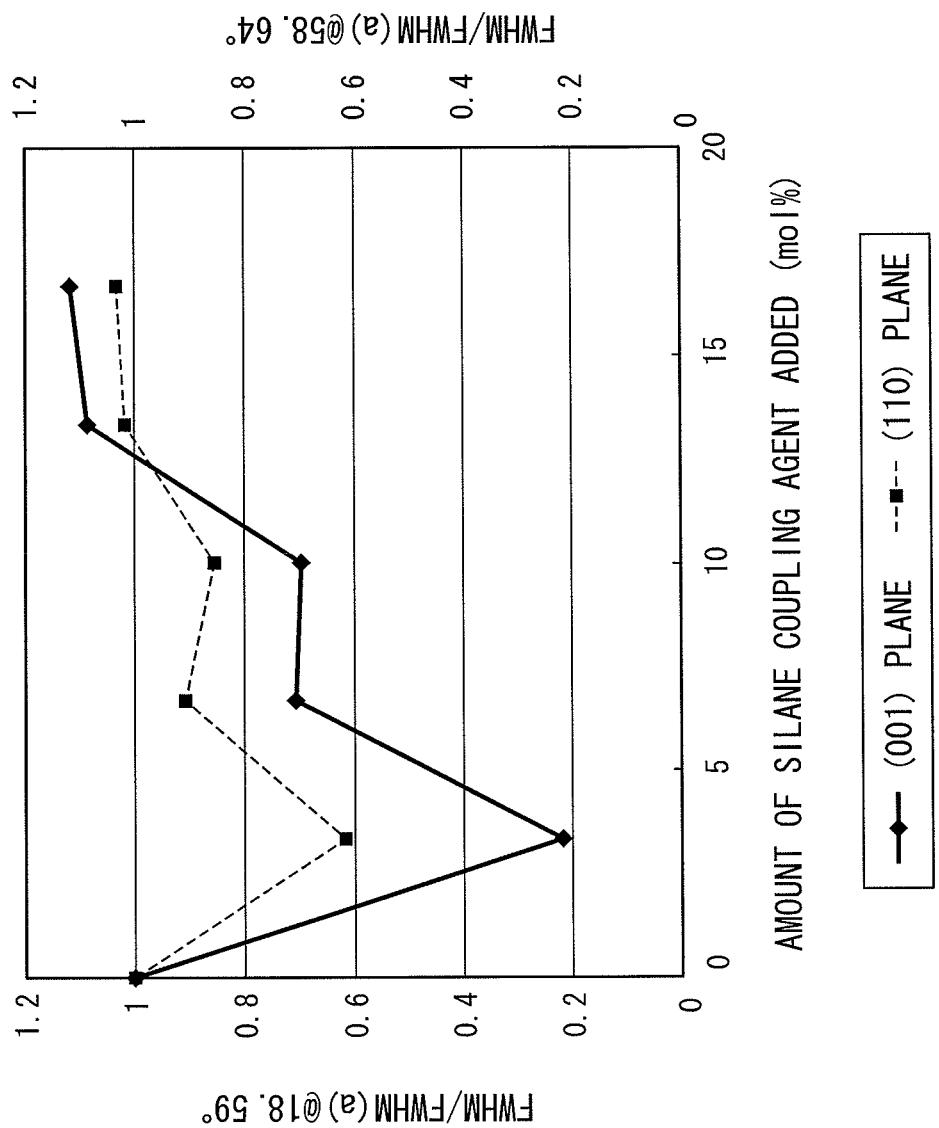
FIG. 4 is a graph showing the ratios of full widths at half maximum with Comparative Example 1 as a reference.

FIG. 4 was created which is a graph of the ratios of the full widths at half maximum for the (001) plane and the (110) plane from the obtained results, with the magnesium hydroxide f produced according to Comparative Example 1-1 as a reference. FIG. 4 is a graph showing the ratios of full widths at half maximum with Comparative Example 1-1 as a reference.

<Results>

Next, the experimental results of the Examples and Comparative Example will be described with reference to the drawings. As shown in FIG. 3, the amount of the silane coupling agent added from 6.5 mol % to 16.2 mol % stabilized the volume average particle size in the small range of 30 nm to 40 nm. Therefore, in terms of particle size, the amount of the silane coupling agent added to the reaction field is preferably 6.5 mol % to 16.2 mol %.

Referring to FIG. 4, the full width at half maximum in the X-ray diffraction with the magnesium hydroxide according to Comparative Example 1-1 as a reference was substantially 1 for both the (001) plane and the (110) plane in the case of the magnesium hydroxide e according to Example 1-5 and the magnesium hydroxide d according to Example 1-4. More specifically, it can be said that the magnesium hydroxide e according to Example 1-5 and the magnesium hydroxide d according to Example 1-4 have substantially the same crystallinity (or slightly inferior, including slightly more amorphous magnesium hydroxide) as the magnesium hydroxide f according to Comparative Example 1-1. However, since the magnesium hydroxides a to c according to Examples 1-1 to 1-3 have smaller values than the comparative example, it can be said that Examples 1-1 to 1-3 all have better crystallinity than Comparative Example 1-1.

Thus, as for crystallinity, it can be said that Example 1-1 to Example 1-5 have the same or more crystallinity than Comparative Example 1-1, and Example 1-1 to Example 1-3 (the magnesium hydroxides a to c) particularly have excellent crystallinity. More specifically, in terms of crystallinity, the amount of the silane coupling agent added to the reaction field is preferably 3.2 mol % to 16.2 mol %, and more preferably 3.2 mol % to 9.7 mol %.

As described above, in view of both particle size and crystallinity, the amount of the silane coupling agent added to the reaction field is preferably 3.2 mol % to 16.2 mol %, more preferably 6.5 mol % to 16.2 mol %, and most preferably 6.5 mol % to 9.7 mol %.

It is to be noted that this effect is produced because the metal hydroxide fine particles and the silane coupling agent have the same hydroxyl group and thus produce an extremely strong affinity, resulting in a significant contribution of the silane coupling agent to the formation of metal hydroxide fine particles during the synthesis. Thus, it is believed that the effect is produced not only in the case of producing a magnesium hydroxide from a sodium hydroxide solution and a magnesium chloride solution, but also generally in the case of forming metal hydroxide fine particles from a metal ion and a hydroxide ion.

As described above, the addition of the silane coupling agent to the reaction field can produce minute metal hydroxide fine particles with favorable crystallinity. The metal hydroxide with favorable crystallinity is likely to cause a dehydration reaction because of its crystals flattened. Therefore, the increased crystallinity can improve the flame retardancy.

[Evaluation 2]

Next, as Evaluation 2, an evaluation was carried out in which a batch method or a microreactor method was used to produce metal hydroxide fine particles (magnesium hydroxide fine particles, lanthanum hydroxide fine particles, calcium hydroxide fine particles) while varying the amount of a silane coupling agent added. The evaluation will be described below in detail.

(1) Production of Metal Hydroxide Fine Particles

In accordance with the following conditions, metal hydroxide fine particles were produced. Magnesium hydroxide fine particles were produced in Example 2-1 to Example 2-9 and Comparative Examples 2-1 and 2-2. Lanthanum hydroxide fine particles were produced in Examples 2-10 to 2-14. Calcium hydroxide fine particles were produced in Examples 2-15 to 2-18.

(a) Formation of Magnesium Hydroxide Particles in Batch (Addition of Surface Preparation Agent to Reaction Field)
<Example 2-1 to Example 2-4>

Prepared were 200 parts by weight of a magnesium chloride aqueous solution adjusted in advance to 0.5 mol/L with 3-aminopropyl trimethoxysilane mixed at a predetermined ratio with respect to the magnesium ions and 100 parts by weight of a sodium hydroxide aqueous solution adjusted to 3 mol/L.

In this case, the predetermined ratio refers to four types of ratios: 0.03 mol % (Example 2-1); 0.3 mol % (Example 2-2); 3.2 mol % (Example 2-3); and 12.9 mol % (Example 2-4).

A slurry of magnesium hydroxide was obtained by stirring the sodium hydroxide aqueous solution in a container at a rate of 500 rpm and putting, into the container, the magnesium chloride aqueous solution at an addition rate of 200 cc/min at room temperature with the use of a nozzle of 0.8 mm in inside diameter.

The obtained slurry was subjected to purification by washing with water until the salt concentration reached 0.00% to obtain a dispersion of magnesium hydroxide fine particles in water. The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide.

(b) Formation of Magnesium Hydroxide Particles in Microreactor (Addition of Surface Preparation Agent to Reaction Field)
<Example 2-5 to Example 2-9>

A magnesium chloride aqueous solution adjusted in advance to 0.5 mol/L with 3-aminopropyl trimethoxysilane mixed at a predetermined ratio with respect to the magnesium ions and a sodium hydroxide aqueous solution adjusted to 3 mol/L were mixed at flow ratios of 200 cc/min and 100 cc/min respectively with each other in a microreactor at room temperature to obtain a slurry of magnesium hydroxide.

In this case, the predetermined ratio refers to five types of ratios: 0.02 mol % (Example 2-5); 0.3 mol % (Example 2-6); 3.2 mol % (Example 2-7); 6.4 mol % (Example 2-8); and 12.9 mol % (Example 2-9).

The obtained slurry was subjected to purification by washing with water until the salt concentration reached 0.00% to obtain a dispersion of magnesium hydroxide fine particles in water. The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide.

(c) Formation of Lanthanum Hydroxide Particles in Microreactor (Addition of Surface Preparation Agent to Reaction Field)
<Example 2-10 to Example 2-14>

A lanthanum chloride aqueous solution adjusted in advance to 0.5 mol/L with 3-aminopropyl trimethoxysilane mixed at a predetermined ratio with respect to the lanthanum ions and a sodium hydroxide aqueous solution adjusted to 3 mol/L were mixed respectively at flow ratios of 200 cc/min and 100 cc/min with each other in a microreactor at room temperature to obtain a slurry of lanthanum hydroxide.

In this case, the predetermined ratio refers to five types of ratios: 0.01 mol % (Example 2-10); 1.1 mol % (Example 2-11); 10.6 mol % (Example 2-12); 21.2 mol % (Example 2-13); and 31.8 mol % (Example 2-14).

The obtained slurry was subjected to purification by washing with water until the salt concentration reached 0.00% to obtain a dispersion of lanthanum hydroxide fine particles in water. The obtained dispersion in water with 3-aminopropyl trimethoxysilane added thereto at 10 weight % with respect to the lanthanum hydroxide particles was heated at 120° C. for 2 hours while stirring, dried, and then redispersed to obtain a lanthanum hydroxide.

(d) Formation of Calcium Hydroxide Particles in Microreactor (Addition of Surface Preparation Agent to Reaction Field)
<Example 2-15 to Example 2-18>

A calcium chloride aqueous solution adjusted in advance to 0.5 mol/L with 3-aminopropyl trimethoxysilane mixed at a predetermined ratio with respect to the calcium ions and a sodium hydroxide aqueous solution adjusted to 3 mol/L were mixed respectively at flow ratios of 200 cc/min and 100 cc/min with each other in a microreactor at room temperature to obtain a slurry of calcium hydroxide.

In this case, the predetermined ratio refers to four types of ratios: 2.1 mol % (Example 2-15); 4.1 mol % (Example 2-16); 8.3 mol % (Example 2-17); 16.5 mol % (Example 2-18).

The obtained slurry was subjected to purification by washing with water until the salt concentration reached 0.00% to obtain a dispersion of calcium hydroxide fine particles in water. The obtained dispersion in water with 3-aminopropyl trimethoxysilane added thereto at 10 weight % with respect to the calcium hydroxide particles was heated at 120° C. for 2 hours while stirring, dried, and then redispersed to obtain a calcium hydroxide.

(e) Formation of Magnesium Hydroxide Particles in Batch (No Surface Preparation Agent Added to Reaction Field)
<Comparative Example 2-1>

Prepared were 200 parts by weight of a magnesium chloride aqueous solution adjusted in advance to 0.5 mol/L and 100 parts by weight of a sodium hydroxide aqueous solution adjusted to 3 mol/L. No 3-aminopropyl trimethoxysilane as a surface preparation agent was added.

A slurry of magnesium hydroxide was obtained by stirring the sodium hydroxide aqueous solution in a container at a rate of 500 rpm and putting, into the container, the magnesium chloride aqueous solution at an addition rate of 200 cc/min at room temperature with the use of a nozzle of 0.8 mm in inside diameter.

The obtained slurry was subjected to purification by washing with water until the salt concentration reached 0.00% to obtain a dispersion of magnesium hydroxide fine particles in water. The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide.

(f) Formation of Magnesium Hydroxide Particles in Microreactor (No Surface Preparation Agent Added to Reaction Field)
<Comparative Example 2-2>

A magnesium chloride aqueous solution adjusted in advance to 0.5 mol/L and a sodium hydroxide aqueous solution adjusted to 3 mol/L were mixed respectively at flow ratios of 200 cc/min and 100 cc/min with each other in a microreactor at room temperature to obtain a slurry of magnesium hydroxide. No 3-aminopropyl trimethoxysilane as a surface preparation agent was added.

The obtained slurry was subjected to purification by washing with water until the salt concentration reached 0.00% to obtain a dispersion of magnesium hydroxide fine particles in water. The obtained dispersion in water with 3-aminopropyl trimethoxysilane added thereto at 10 weight % with respect to the magnesium hydroxide particles was heated at 120° C. for 2 hours while stirring, dried, and then redispersed to obtain a magnesium hydroxide.

(g) Formation of Lanthanum Hydroxide Particles in Microreactor (No Surface Preparation Agent Added to Reaction Field)
<Comparative Example 2-3>

A lanthanum chloride aqueous solution adjusted in advance to 0.5 mol/L and a sodium hydroxide aqueous solution adjusted to 3 mol/L were mixed respectively at flow ratios of 200 cc/min and 100 cc/min with each other in a microreactor at room temperature to obtain a slurry of lanthanum hydroxide. No 3-aminopropyl trimethoxysilane as a surface preparation agent was added.

The obtained slurry was subjected to purification by washing with water until the salt concentration reached 0.00% to obtain a dispersion of lanthanum hydroxide fine particles in water. The obtained dispersion in water with 3-aminopropyl trimethoxysilane added thereto at 10 weight % with respect to the lanthanum hydroxide particles was heated at 120° C. for 2 hours while stirring, dried, and then an attempt to redisperse the lanthanum hydroxide particles but the particles were not dispersed.

(h) Formation of Calcium Hydroxide Particles in Microreactor (No Surface Preparation Agent Added to Reaction Field)
<Comparative Example 2-4>

A calcium chloride aqueous solution adjusted in advance to 0.5 mol/L and a sodium hydroxide aqueous solution adjusted to 3 mol/L were mixed respectively at flow ratios of 200 cc/min and 100 cc/min with each other in a microreactor at room temperature to obtain a slurry of calcium hydroxide. No 3-aminopropyl trimethoxysilane as a surface preparation agent was added.

The obtained slurry was subjected to purification by washing with water until the salt concentration reached 0.00% to obtain a dispersion of calcium hydroxide fine particles in water. The obtained dispersion in water with 3-aminopropyl trimethoxysilane added thereto at 10 weight % with respect to the calcium hydroxide particles was heated at 120° C. for 2 hours while stirring, dried, and then an attempt to redisperse the calcium hydroxide particles was made but the particles were not dispersed.

(2) Measurement of Particle Size and Distribution

Microtrac UPA (from NIKKISO CO., LTD.) was used to measure the particle sizes and distributions of the metal hydroxide fine particles obtained according to Example 2-1 to Example 2-18, Comparative Example 2-1, and Comparative Example 2-2.

Conditions for Measurement of Particle Size and Distribution
  Solvent: Water (Refractive Index Parameter: 1.33)
  Particle: $Mg(OH)_2$, $La(OH)_3$, $Ca(OH)_2$
  Loading index: adjusted in the range of 0.1 to 1

Figure 5:
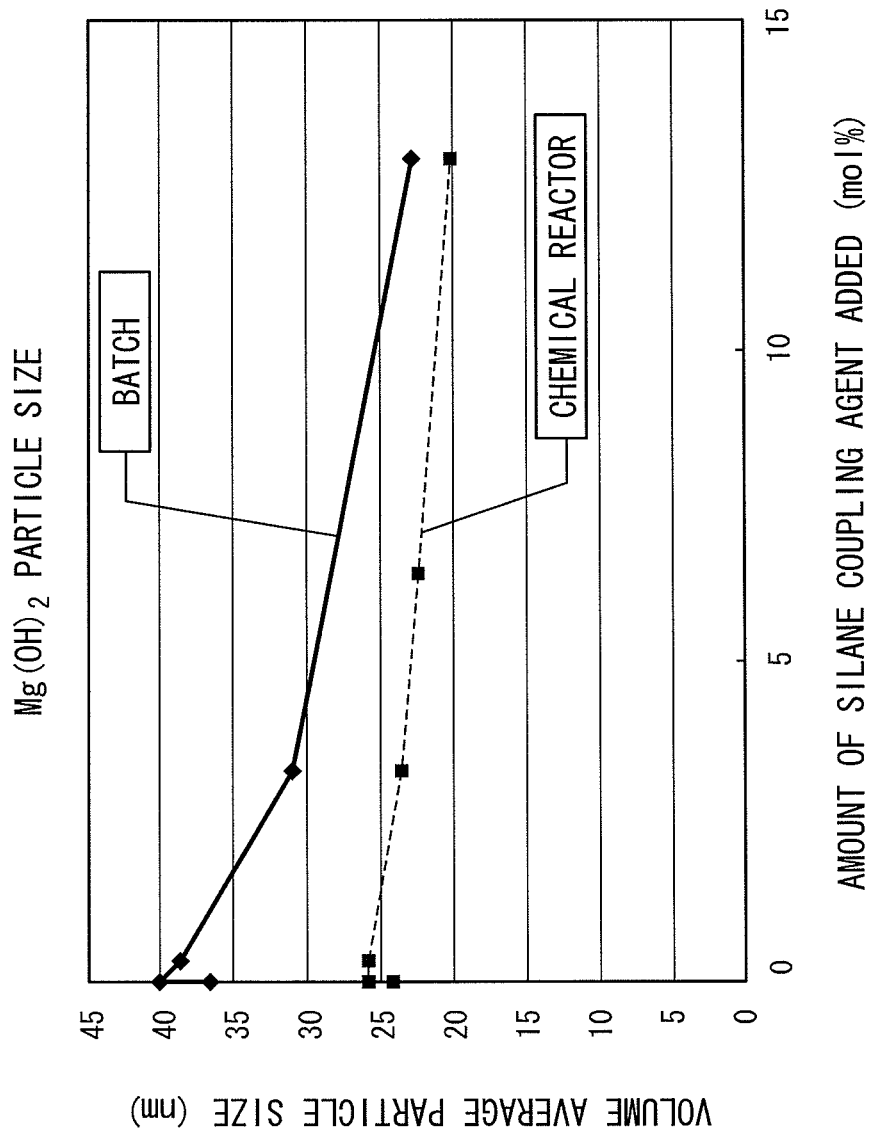
FIG. 5 is a graph showing the relationship between the amount of a silane coupling agent added to a reaction field and the volume average particle size (MV) of $Mg(OH)_2$.
Figure 6:
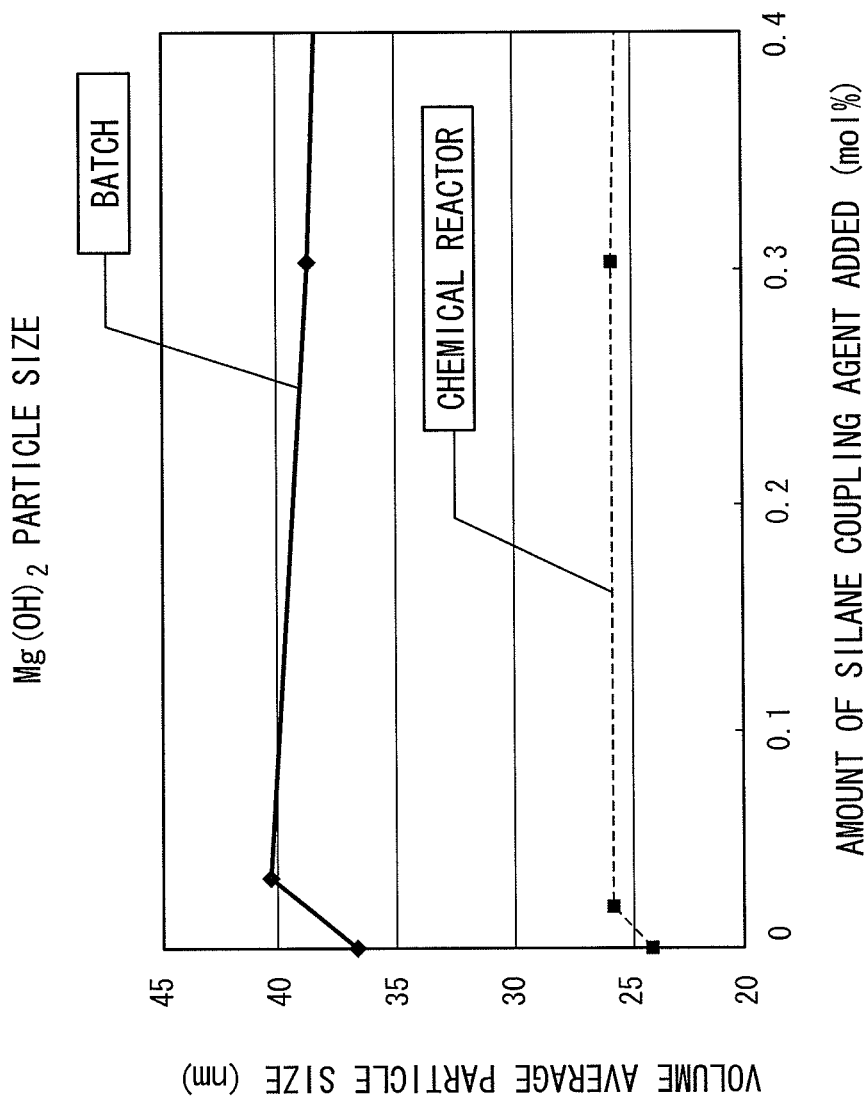
FIG. 6 is a partially enlarged graph of FIG. 5.
Figure 7:
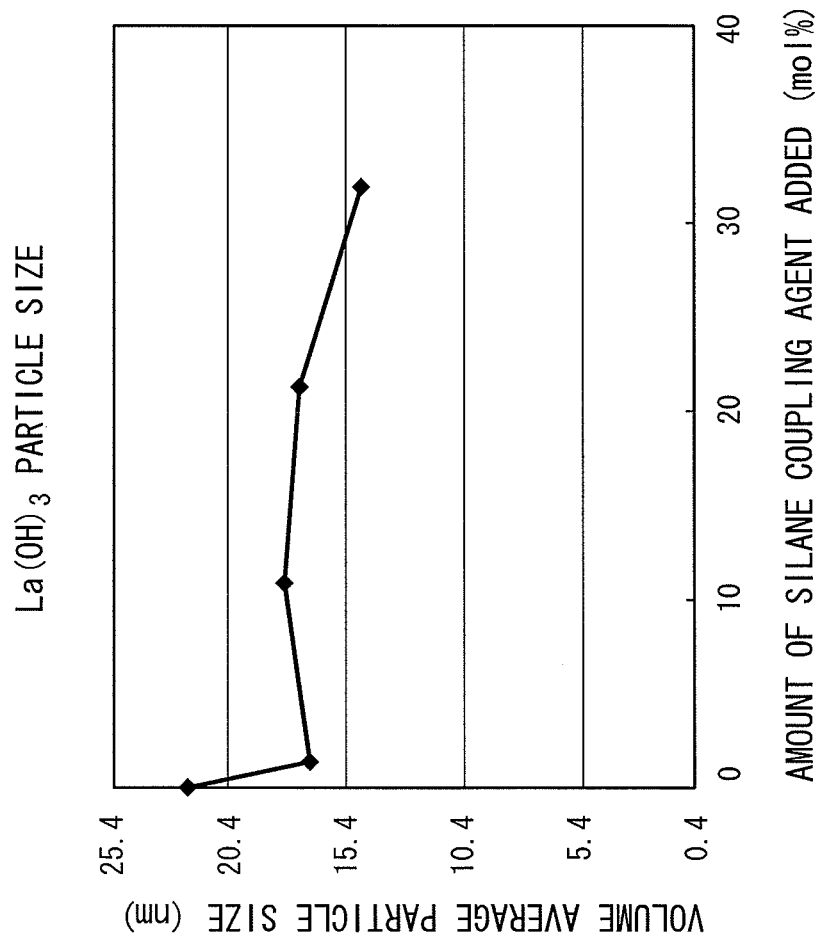
FIG. 7 is a graph showing the relationship between the amount of a silane coupling agent added to a reaction field and the volume average particle size (MV) of $La(OH)_3$.
Figure 8:
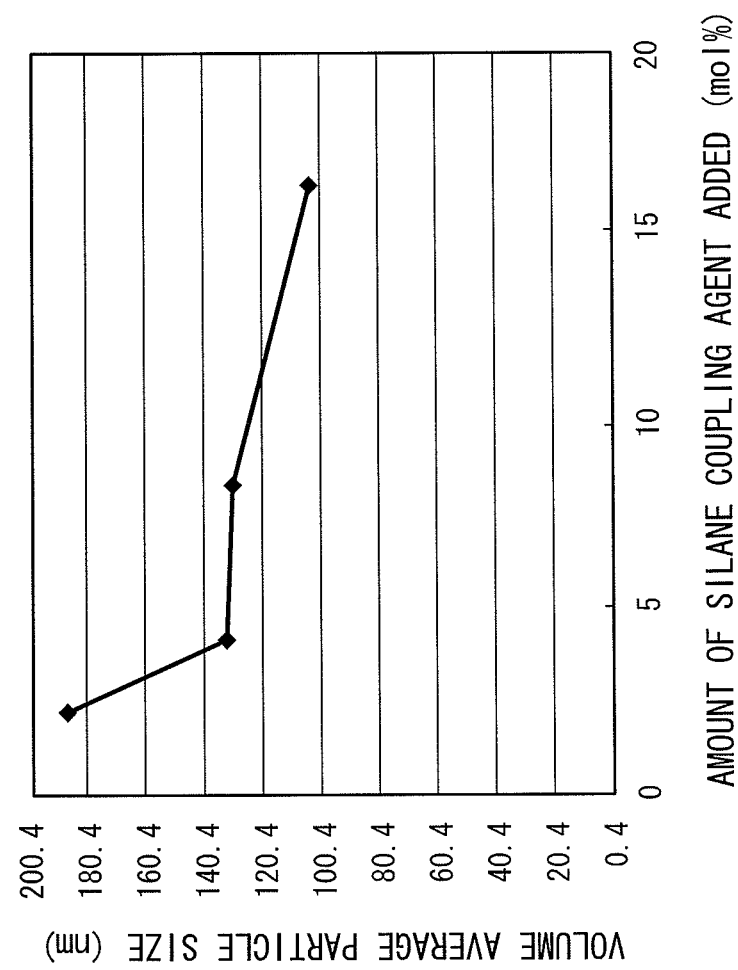
FIG. 8 is a graph showing the relationship between the amount of a silane coupling agent added to a reaction field and the volume average particle size (MV) of $Ca(OH)_2$.

FIGS. 5 to 8 were created which are each a graph indicating the obtained volume average particle size (MV) on the Y axis and the amount of the silane coupling agent added to the reaction field on the X axis. FIG. 5 is a graph showing the relationship between the amount of the silane coupling agent added to the reaction field and the volume average particle size (MV) of $Mg(OH)_2$. FIG. 6 is a partially enlarged graph of FIG. 5. FIG. 7 is a graph showing the relationship between the amount of the silane coupling agent added to the reaction field and the volume average particle size (MV) of $La(OH)_3$. FIG. 8 is a graph showing the relationship between the amount of the silane coupling agent added to the reaction field and the volume average particle size (MV) of $Ca(OH)_2$.

(3) Measurement of Crystallinity

An X-ray diffractometer RINT 2000 (from Rigaku Corporation) was used to carry out X-ray diffraction measurements for the metal hydroxide fine particles obtained according to Example 2-1 to Example 2-18, Comparative Example 2-1, and Comparative Example 2-2.

Conditions for X-ray Diffraction
  Radiation source: $CuK\alpha1$ ($\lambda=1.54056$)
  Voltage: 55 kV
  Current: 280 mA
  Measuring Range: 10 to 80° @2θ

Figure 9:
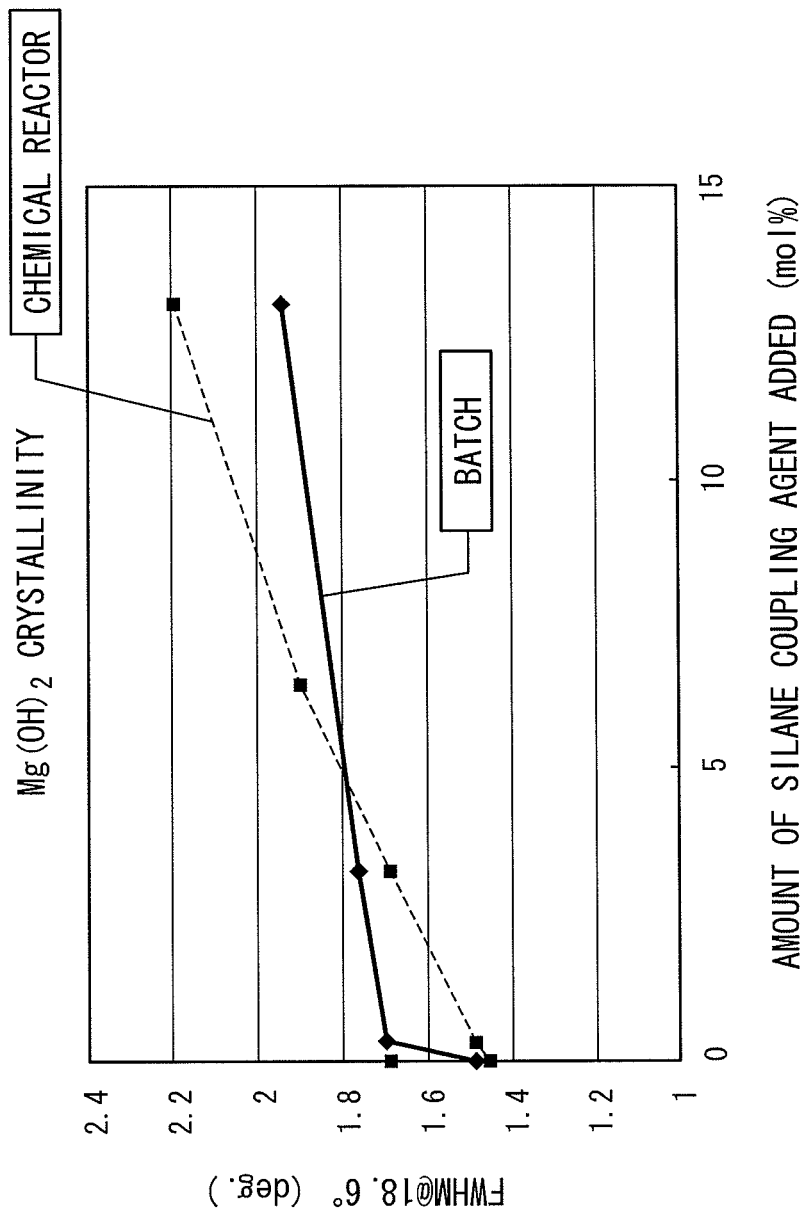
FIG. 9 is a graph showing the relationship between the amount of the silane coupling agent added and the full width at half maximum at 18.6° for $Mg(OH)_2$.
Figure 10:
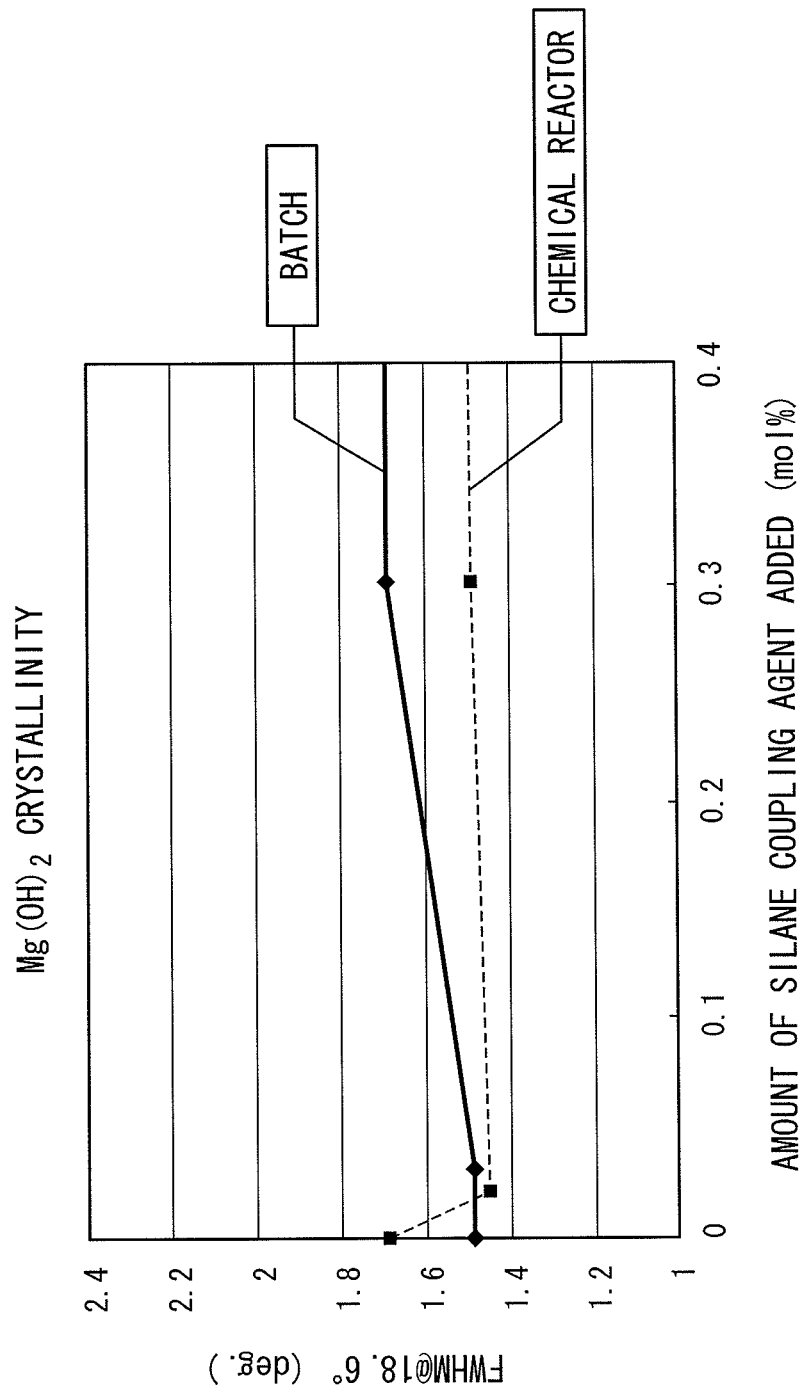
FIG. 10 is a partially enlarged graph of FIG. 9.
Figure 11:
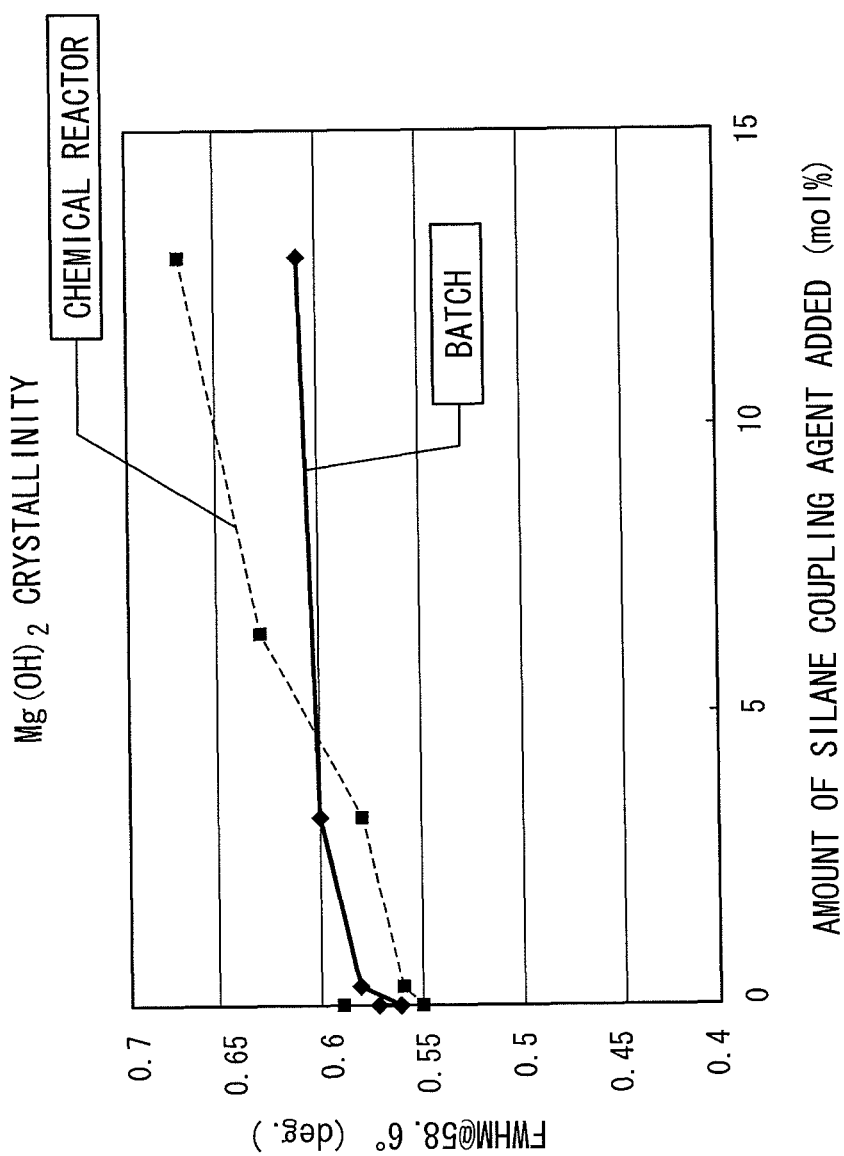
FIG. 11 is a graph showing the relationship between the amount of the silane coupling agent added and the full width at half maximum at 58.6° for $Mg(OH)_2$.
Figure 12:
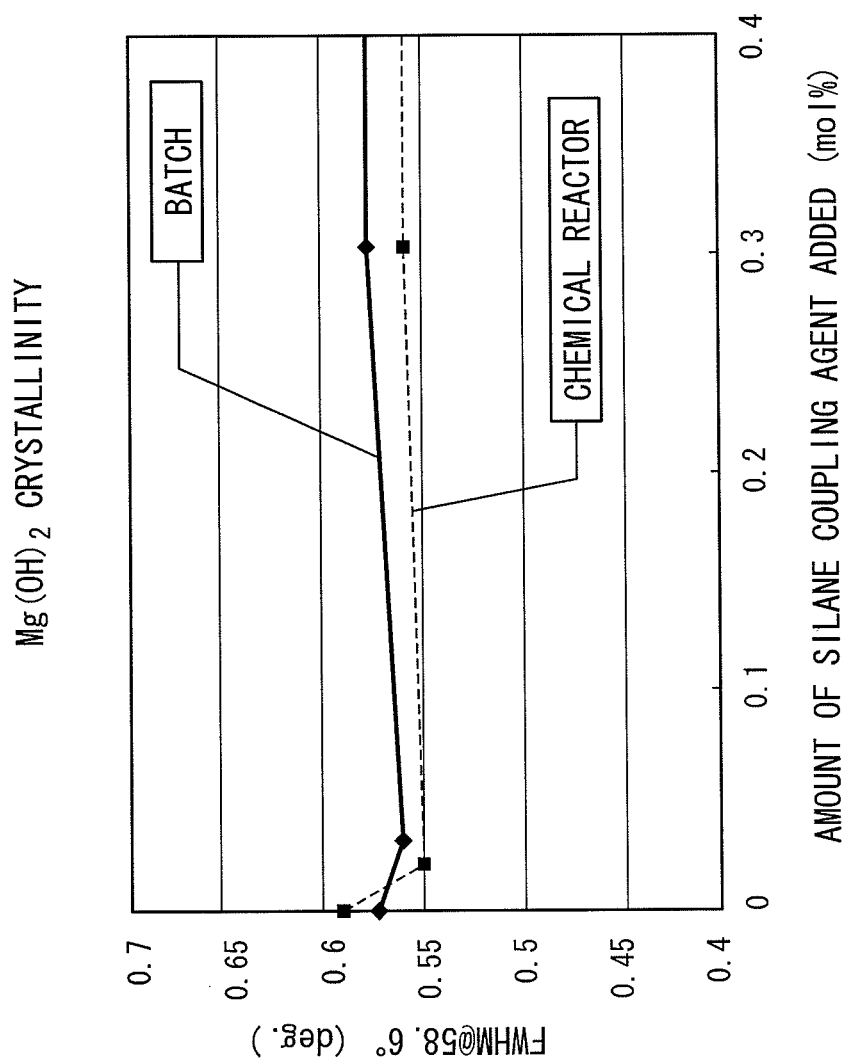
FIG. 12 is a partially enlarged graph of FIG. 11.
Figure 13:
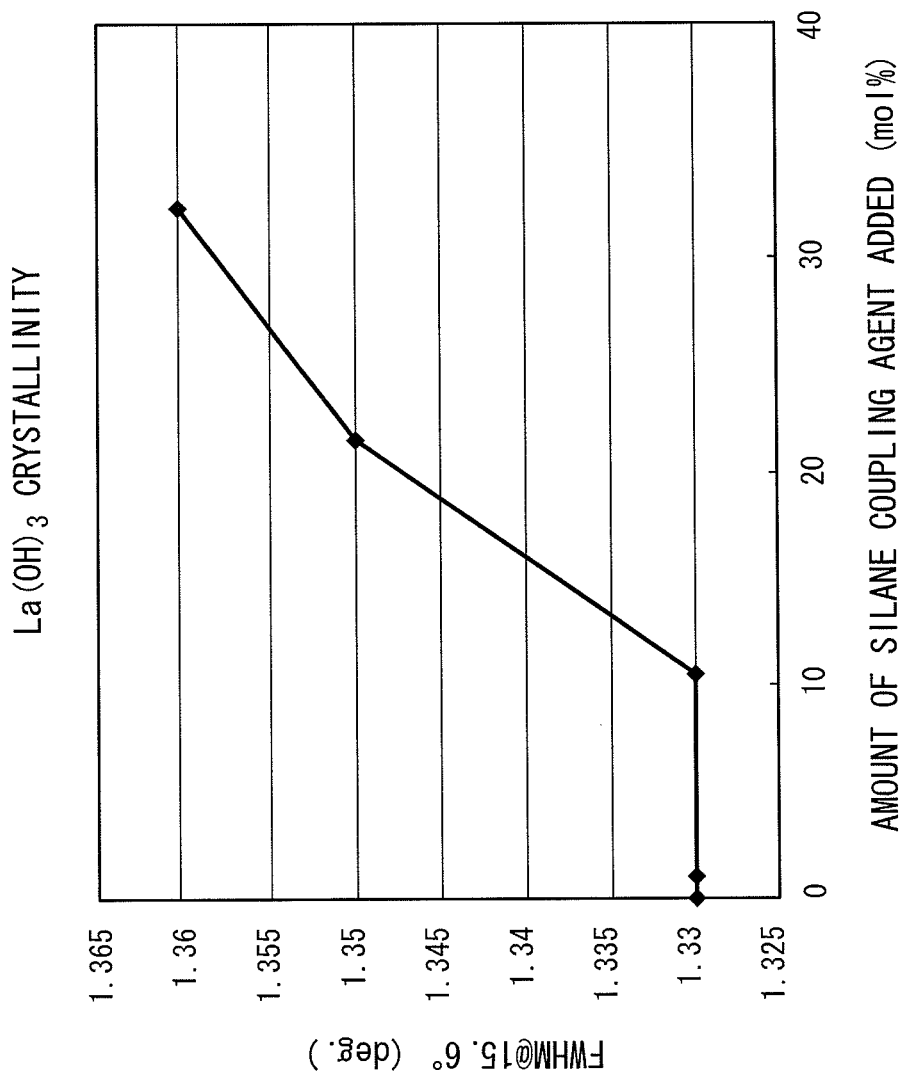
FIG. 13 is a graph showing the relationship between the amount of the silane coupling agent added and the full width at half maximum at 15.6° for $La(OH)_3$.
Figure 14:
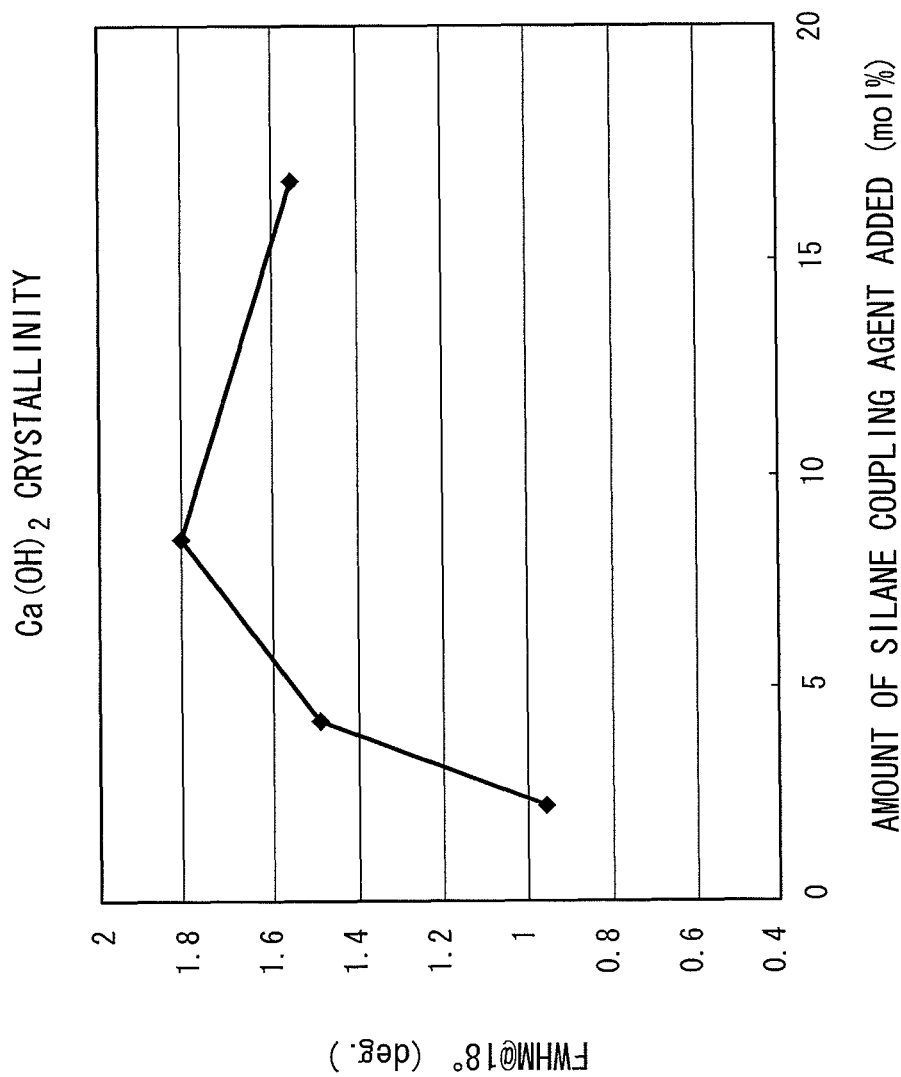
FIG. 14 is a graph showing the relationship between the amount of the silane coupling agent added and the full width at half maximum at 18° for $Ca(OH)_2$.
Figure 15:
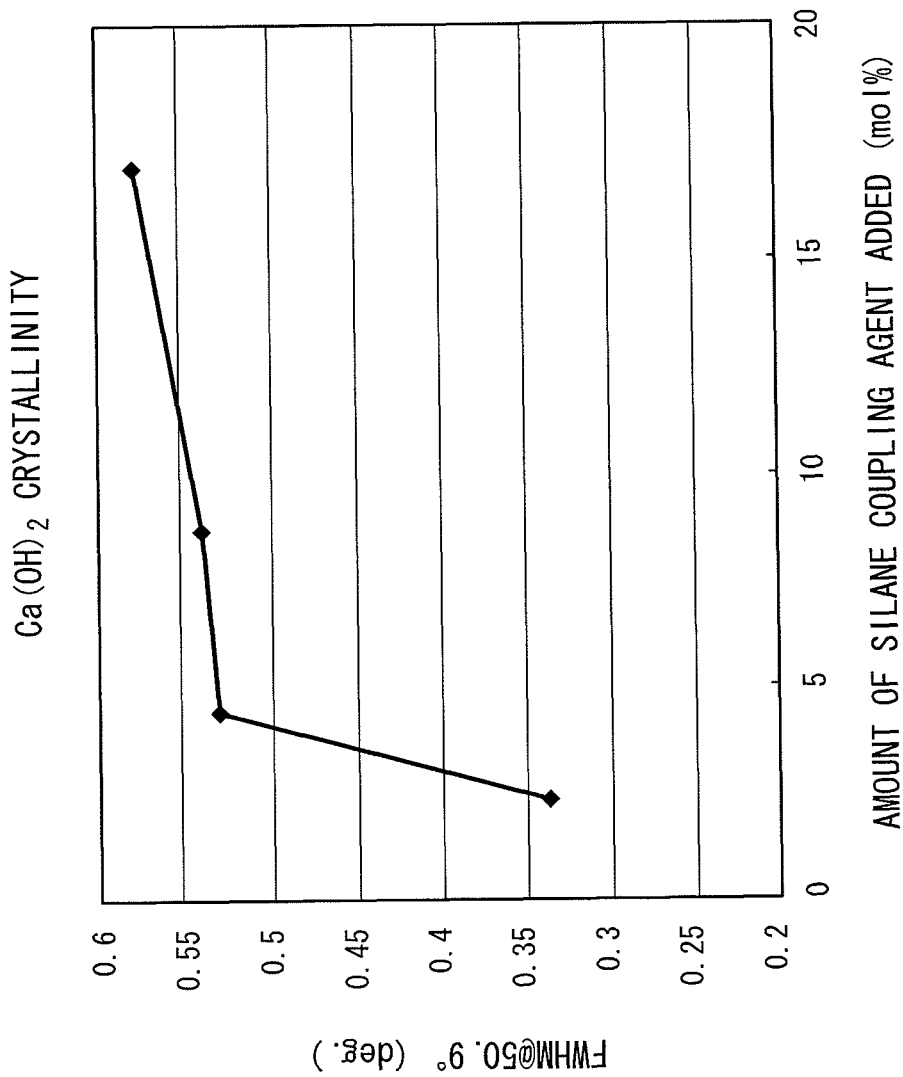
FIG. 15 is a graph showing the relationship between the amount of the silane coupling agent added and the full width at half maximum at 50.9° for $Ca(OH)_2$.

The full widths at half maximum were obtained from the obtained results, and FIGS. 9 to 15 were created which are each a graph indicating the full width at half maximum on the Y axis and indicating the silane coupling agent on the X axis. FIG. 9 is a graph showing the relationship between the amount of the silane coupling agent added and the full width at half maximum at 18.6° for $Mg(OH)_2$. FIG. 10 is a partially enlarged graph of FIG. 9. FIG. 11 is a graph showing the relationship between the amount of the silane coupling agent added and the full width at half maximum at 58.6° for $Mg(OH)_2$. FIG. 12 is a partially enlarged graph of FIG. 11. FIG. 13 is a graph showing the relationship between the amount of the silane coupling agent added and the full width at half maximum at 15.6° for $La(OH)_3$. FIG. 14 is a graph showing the relationship between the amount of the silane coupling agent added and the full width at half maximum at 18° for $Ca(OH)_2$. FIG. 15 is a graph showing the relationship between the amount of the silane coupling agent added and the full width at half maximum at 50.9° for $Ca(OH)_2$.

(4) Results

A table is shown in FIGS. 16A and 16B, which list the production conditions and the measurement results of volume average particle sizes and full widths at half maximum (FWHM) for Example 2-1 to Example 2-18 and Comparative Example 2-1 to Comparative Example 2-4. FIGS. 16A and 16B are diagrams which list conditions for producing the metal hydroxides, and the measurement results of volume average particle sizes and full widths at half maximum.

As can be seen from FIGS. 5, 6, 16A, and 16B, the silane coupling agent added to the reaction field at 3.2 mol % or more with respect to the magnesium ions provided magnesium hydroxide fine particles with smaller volume average particle sizes than in the case of adding no silane coupling agent. Similar results were obtained both in the case of developing the reaction in a batch and in the case of developing the reaction in the chemical reactor. In addition, fine particles with a smaller volume average particle size were obtained in the case of the chemical reactor than in the case of the batch.

In Evaluation 2, fine particles with a smaller volume average particle size were obtained than in Evaluation 1. This is believed to be because there is a difference in terms of the pump for supplying the solution to the chemical reactor. The pump used in Evaluation 1 provided higher pulsation, which is believed to have affected the reaction.

In addition, referring to FIGS. 7, 8, and 16, the volume average particle size for the fine particles produced is also smaller in the production of the lanthanum hydroxide fine particles and of the calcium hydroxide fine particles, as the amount of the silane coupling agent added to the reaction field is increased.

In the production of the lanthanum hydroxide fine particles and of the calcium hydroxide fine particles, when no silane coupling agent was added to the reaction field, both the lanthanum hydroxide and the calcium hydroxide were aggregated due to their large aggregation forces, thus failing to obtain nanosized fine particles.

As described above, in the case of a method for producing a metal hydroxide fine particle by reacting a metal ion with a hydroxide ion, the supply of a silane coupling agent to the reaction field for the metal ion and hydroxide ion allows for the production of nanosized metal hydroxide fine particles.

In addition, the adjustment of the amount of the silane coupling agent supplied to the reaction field allows for the adjustment of metal hydroxide fine particles to be produced in terms of size. Furthermore, in order to form nanosized fine particles of a metal hydroxide with a large aggregation force, such as lanthanum hydroxide and calcium hydroxide, it is considered essential that a silane coupling agent is supplied to the reaction field.

Next, referring to FIGS. 9 to 16, the full width at half maximum has a tendency to increase slightly, as the amount of the silane coupling agent added to the reaction field is increased. However, the increases have extremely small values as far as the numerical values of the increases tell, and it can be thus said that the crystallinity itself is not worse as far as the numerical values tell.

As described above, the addition of the silane coupling agent to the reaction field allows for the production of nanosized metal hydroxide fine particles almost without degrading the crystallinity.

What is claimed is:
1. A method for producing a metal hydroxide fine particle for flame retardants by reacting a metal ion with a hydroxide ion in a solvent, the method comprising:
  a mixing and reacting step of creating a metal hydroxide fine particle by supplying a metal ion chosen from among magnesium ion, lanthanum ion, and calcium ion, the hydroxide ion, and a silane coupling agent to a reaction field to mix and react the ions;

a purification treatment step of removing salt which is byproduct produced by mixing and reacting step from the metal hydroxide fine particle;

a surface preparation step of stabilizing the surface of the metal hydroxide fine particle by applying a surface preparation agent chosen from among silane coupling agent, aluminum coupling agent, and titanate coupling agent to the metal hydroxide fine particle;

a heat treatment step of flattening the metal hydroxide fine particle by applying a hydrothermal treatment to the metal hydroxide fine particle and increasing the specific surface area of the metal hydroxide fine particle; and a drying step of removing a solvent from a suspension of the metal hydroxide fine particles in the solvent, wherein the mixing and reacting step, the purification treatment step, the heat treatment step, and the drying step are performed in this order.

2. The method for producing a metal hydroxide fine particle for flame retardants according to claim 1, wherein the silane coupling agent is supplied to the reaction field in the range of 3.2 mol % to 16.2 mol % with respect to the metal ion in the mixing and reacting step.

3. The method for producing a metal hydroxide fine particle for flame retardants according to claim 1, wherein the ratio of the number of moles of the hydroxide ion to the number of moles of the metal ion is adapted to be not less than the value of the valence of the metal ion.

4. The method for producing a metal hydroxide fine particle for flame retardants according to claim 2, wherein the ratio of the number of moles of the hydroxide ion to the number of moles of the metal ion is adapted to be not less than the value of the valence of the metal ion.

5. The method for producing a metal hydroxide fine particle for flame retardants according to claim 1, wherein the concentration of the metal ion is 0.2 mol/L or more in the solvent.

6. The method for producing a metal hydroxide fine particle for flame retardants according to claim 4, wherein the concentration of the metal ion is 0.2 mol/L or more in the solvent.

7. The method for producing a metal hydroxide fine particle according to claim 1, wherein the metal ion is a magnesium ion.

8. The method for producing a metal hydroxide fine particle according to claim 1, wherein the metal ion is a lanthanum ion.

9. The method for producing a metal hydroxide fine particle according to claim 1, wherein the metal ion is a calcium ion.

* * * * *